(12) United States Patent
Klotchkov et al.

(10) Patent No.: US 10,701,657 B2
(45) Date of Patent: Jun. 30, 2020

(54) TIME SYNCHRONIZATION FOR NODES IN A WIRELESS PERSONAL AREA NETWORK (WPAN)

(71) Applicants: Ilya V. Klotchkov, St. Petersburg (RU); Intel Corporation, Santa Clara, CA (US)

(72) Inventors: Ilya V. Klotchkov, St. Petersburg (RU); Dmitry Shifrin, St. Peterburg (RU)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 15/575,746

(22) PCT Filed: Jun. 24, 2015

(86) PCT No.: PCT/RU2015/000390
§ 371 (c)(1),
(2) Date: Nov. 20, 2017

(87) PCT Pub. No.: WO2016/209102
PCT Pub. Date: Dec. 29, 2016

(65) Prior Publication Data
US 2018/0124731 A1    May 3, 2018

(51) Int. Cl.
*H04W 56/00* (2009.01)
*H04L 7/02* (2006.01)

(52) U.S. Cl.
CPC ........... *H04W 56/0065* (2013.01); *H04L 7/02* (2013.01); *H04W 56/0015* (2013.01)

(58) Field of Classification Search
CPC .. H04L 7/02; H04W 56/0065; H04W 56/0015
See application file for complete search history.

(56) References Cited

U.S. PATENT DOCUMENTS

| | | | |
|---|---|---|---|
| 8,953,644 B2* | 2/2015 | Chandra | H04J 3/0667 370/503 |
| 2004/0008661 A1* | 1/2004 | Myles | H04J 3/0664 370/350 |

(Continued)

FOREIGN PATENT DOCUMENTS

EP   2800409 A1   11/2014

OTHER PUBLICATIONS

"International Application Serial No. PCT/RU2015/000390, International Preliminary Report on Patentability dated Jan. 4, 2018", 10 pgs.

(Continued)

*Primary Examiner* — Chi H Pham
*Assistant Examiner* — Weibin Huang
(74) *Attorney, Agent, or Firm* — Kowert, Hood, Munyon, Rankin & Goetzel, P.C.

(57) ABSTRACT

Described herein are systems, methods, and apparatuses for time synchronization for nodes in a wireless personal area network (WPAN). A first message can be received, via an advertising channel, from an advertising node of a WPAN, the first message comprising an advertising message and a message identifier. A second message can be received from a timekeeper node of the WPAN, the second message comprising the message identifier of the first message and timestamp information identifying a time the second message was received by the timekeeper node. A time offset value can be calculated for a clock circuitry with respect to the advertising node, the time offset value comprising a difference between a time the first message was received by the receiver circuitry and the timestamp information of the second message. The clock circuitry can be adjusted based, at least in part, on the time offset value.

23 Claims, 8 Drawing Sheets

(56) References Cited

U.S. PATENT DOCUMENTS

| | | | | |
|---|---|---|---|---|
| 2009/0122781 A1* | 5/2009 | Voglewede | ............ | H04J 3/0667 |
| | | | | 370/350 |
| 2009/0147768 A1* | 6/2009 | Ji | ......................... | H04J 3/0664 |
| | | | | 370/350 |
| 2011/0216660 A1* | 9/2011 | Lee | ........................... | H04J 3/06 |
| | | | | 370/252 |
| 2011/0268097 A1* | 11/2011 | Agrawala | ................ | G01S 5/021 |
| | | | | 370/338 |
| 2013/0132502 A1* | 5/2013 | Stacey | ............... | H04W 56/0015 |
| | | | | 709/208 |
| 2014/0355628 A1 | 12/2014 | Akhlaq et al. | | |
| 2016/0262120 A1* | 9/2016 | Shani | .................. | H04W 40/244 |
| 2018/0132199 A1* | 5/2018 | Zhang | ................. | H04W 56/002 |
| 2019/0089472 A1* | 3/2019 | Zhang | ................. | H04B 7/2643 |

OTHER PUBLICATIONS

"Application Serial No. PCT/RU2015/000390, Invitation to Pay Add'l Fees and Partial Search Rpt dated Apr. 5, 2016", 8 pgs.
"International Application Serial No. PCT/RU2015/000390, International Search Report dated Jun. 10, 2016", 5 pgs.
"International Application Serial No. PCT/RU2015/000390, Written Opinion dated Jun. 10, 2016", 8 pgs.
Liu, Jia, et al., "Adaptive Device Discovery in Bluetooth Low Energy Networks", Vehicular Technology Conference, (Jun. 2, 2013), 1-5.

* cited by examiner

TIME SYNCHRONIZATION FOR NODES IN A WIRELESS PERSONAL AREA NETWORK (WPAN)

TECHNICAL FIELD

Examples of the disclosure pertain to wireless communications. Some examples relate to clock synchronization between nodes in a wireless personal area network (WPAN).

BACKGROUND

Numerous processes exist for synchronizing wireless devices via transmission signals. Some processes use infrared timing pulses, but these processes are limited by the range these pulses can be transmitted and by potential line-of-sight difficulties. Some processes broadcast a synchronization signal or message over radio frequencies. These processes allow for synchronizing wireless devices over an extended distance and no line-of-sight issues, but can suffer from reduced synchronization accuracy due to transmission/reception delays over radio frequencies.

DETAILED DESCRIPTION

The following description and the drawings sufficiently illustrate specific example implementations to enable those skilled in the art to practice them. Other examples can incorporate structural, logical, electrical, process, and other changes. Portions and features of some examples can be included in, or substituted for, those of other examples. Examples set forth in the claims encompass all available equivalents of those claims.

In some example implementations, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, a wearable mobile computing device (e.g., a mobile computing device included in a wearable housing), an instant messaging device, a digital camera, an access point, a television, a medical device (e.g., a heart rate monitor, a blood pressure monitor, etc.), or other device that can receive and/or transmit information wirelessly. In some examples, the mobile device or other device can be a user equipment (UE) or an Evolved Node-B (eNodeB) configured to operate in accordance with 3GPP standards (e.g., the 3GPP Long Term Evolution ("LTE") Advanced Release 12 (March 2014) (the "LTE-A Standard")). In some examples, the mobile device or other device can be configured to operate according to other protocols or standards, including IEEE 802.11, IEEE 802.15, Bluetooth Core, or other IEEE or 3GPP standards. In some examples, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
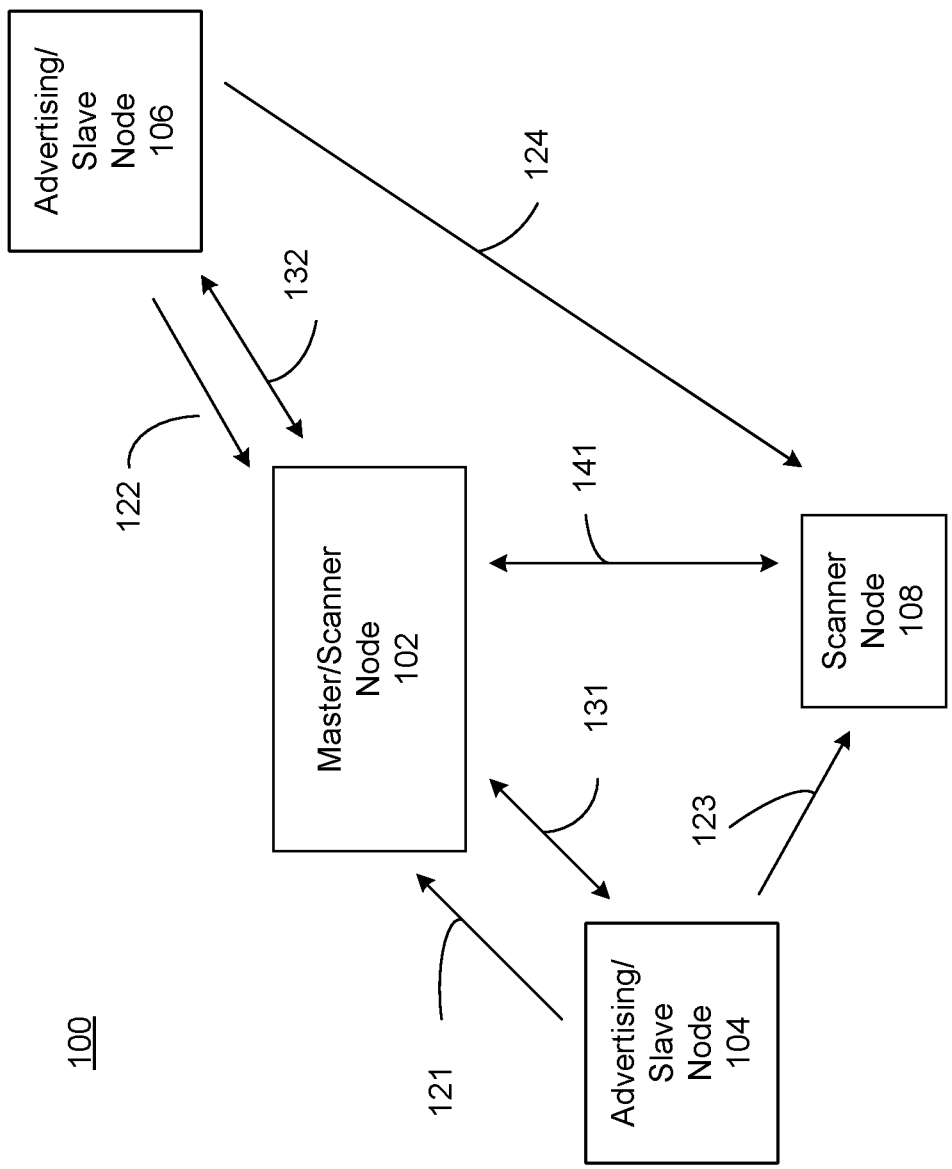
FIG. 1 is an illustration of a system of network nodes in accordance with some examples of the disclosure.

FIG. 1 is an illustration of a system of network nodes in accordance with some examples of the disclosure. In this example, a system 100 is illustrated as a system of nodes interconnected in a wireless personal area network (WPAN) via a short range communications protocol, such as Bluetooth, Near Field Communication (NFC), Zigbee, etc. The exemplary system 100 discussed in detail below is described as a Bluetooth Low Energy (BLE) network of interconnected nodes.

In this example, the system 100 can be configured to utilize one or more of a time division multiple access (TDMA) scheme or a frequency division multiple access (FDMA) scheme to support data communications. The system 100 can be configured to divide a plurality of physical channels into advertising channels (such as the advertising channels 121-124) and data channels (such as the data channels 131-132) per, for example, an FDMA scheme. In some examples, additional channels can be allocated for point-to-point communications (alternatively referred to herein as direct node-to-node messages), such as channel 141.

For the advertising channels 121-124, network nodes can function in a role as an advertising node (such as the nodes 104 and 106) or a scanner node (such as the nodes 102 and 108). For the data channels 131-132, network nodes such as the node 102 can function in a role as a master node, and the nodes 104 and 106 can function as slave nodes. Nodes can execute multiple functions—e.g., the node 102 can function as a scanner node for the advertising channels 121-122 and a master node for data channels 131-132, and the node 104 can function as an advertising node for advertising channels 121 and 123 and as slave node for data channel 131.

The nodes 104 and 106 can be configured to advertise service and/or availability for a link layer connection within advertising events. An advertising event can begin when an advertising packet is ready for transmission at one of the nodes. The nodes 104 and 106 can subsequently operate as slave nodes once a link layer connection has been set up for the data channels 131 and 132, respectively.

The nodes 102 and 108 can be configured to operate as scanner nodes to search for advertising BLE nodes within a pre-determined distance/range. The nodes 102 and 108 can be configured to perform a passive scan or an active scan. In a passive scan, the nodes 102 and 108 can monitor advertising packets without transmitting messages back to advertising nodes. In an active scan, the nodes 102 and 108 can be configured to request an advertising node to transmit additional information not included in the received advertising packets.

For communication between advertising nodes 104 and 106 and scanner nodes 102 and 108, advertising packets can include time synchronization information. In some examples, the advertising packets can include, for example, payload information or data fields used by the scanner nodes 102 and 108 to synchronize their internal timing signal with the advertising node. This payload information can include signal timing event information (e.g., a number of pulses of a timing signal between packet transmissions) and an offset time that specifies a time difference between when the signal timing event occurred and when the advertising packet was broadcast by the advertising node.

Figure 2:
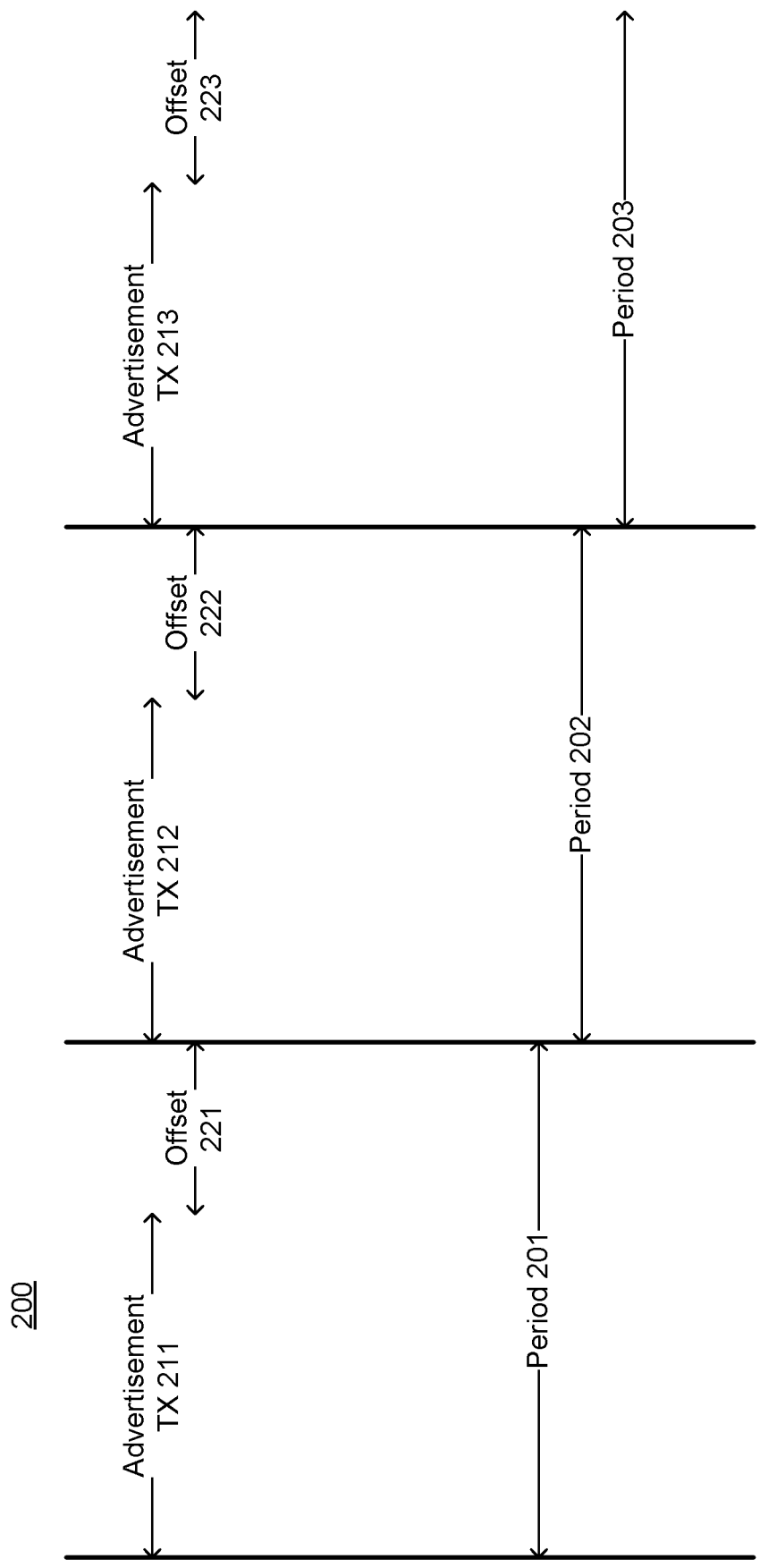
FIG. 2 is an illustration of an advertising message transmission timeline in accordance with some examples of the disclosure.

FIG. 2 is an illustration of an advertising message transmission timeline in accordance with some examples of the disclosure. A timeline 200 is illustrated as including advertising transmission periods 201, 202, and 203. The advertising transmission periods 201-203 are shown to comprise equal or substantially equal time periods. The advertising transmission period 201 includes an interval for an advertising node to execute an advertising packet transmission 211, and a pre-determined offset 221 delaying the subsequent advertising packet transmission 212 (periods 202 and 203 each include advertising packet transmissions 212 and 213 and offsets 222 and 223, respectively).

In some examples, the advertising packet transmissions 211-213 for the advertising node to transmit an advertising packet include a plurality of sequential transmissions of the same advertising packet on different frequency channels. Broadcasting on different frequency channels avoids potential interference issues that can arise, for example, in an environment that includes a plurality of nodes broadcasting messages simultaneously. The pre-determined offsets 221-223 can be an amount of time used to account for potential advertising packet transmission or reception delays.

Figure 3:
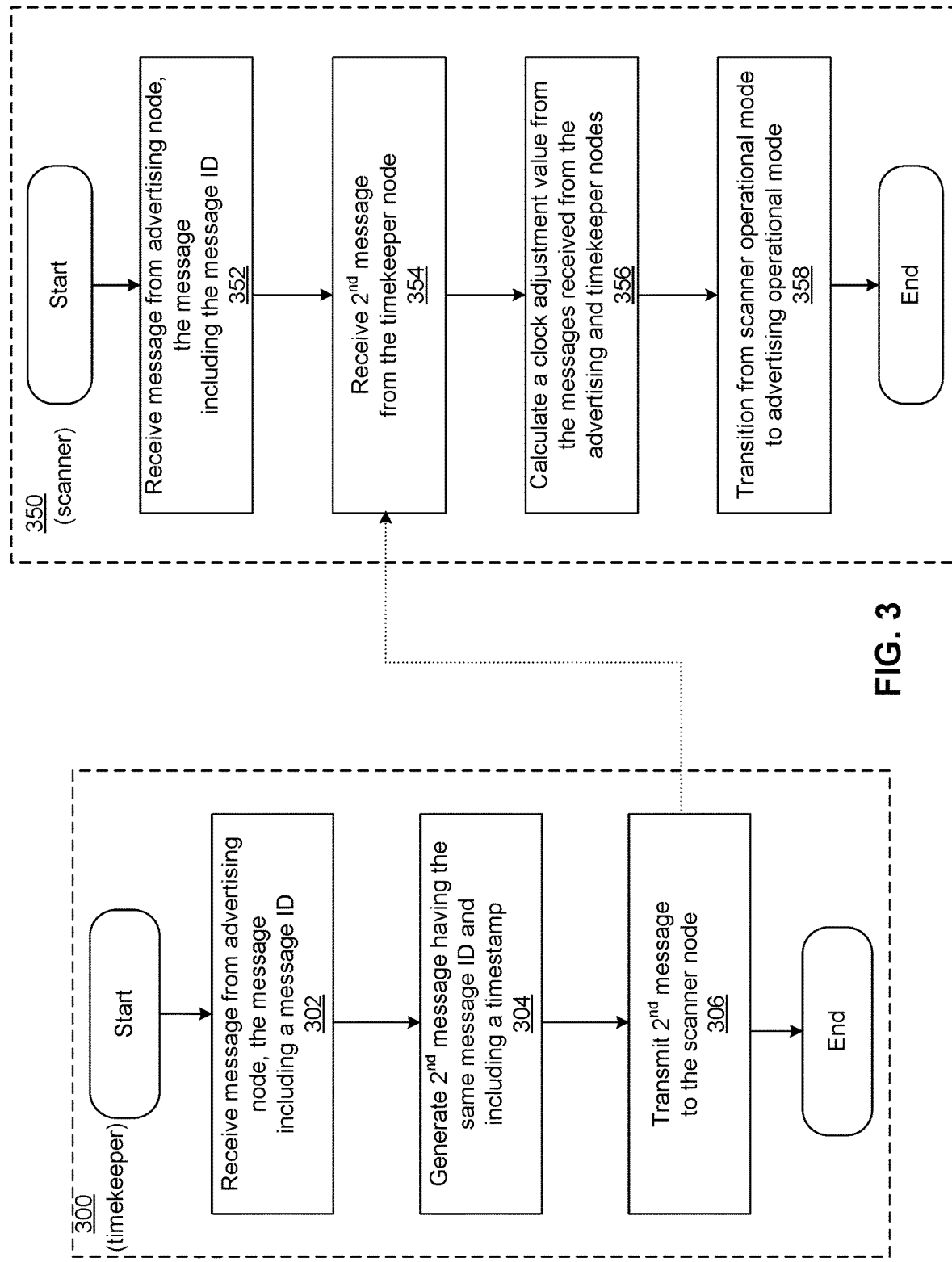
FIG. 3 is an illustration of flow diagrams describing time synchronization processes for network nodes in accordance with some examples of the disclosure.

FIG. 3 is an illustration of flow diagrams describing time synchronization processes for network nodes in accordance with some examples of the disclosure. Process and logical flow diagrams as illustrated herein provide examples of sequences of various process actions. Although shown in a particular sequence or order, unless otherwise specified, the order of the actions may be modified. Thus, the described and illustrated implementations should be understood only as examples; the illustrated processes may be performed in a different order, and some actions may be performed in parallel. Additionally, one or more actions may be omitted in various examples; thus, not all actions are executed in every implementation. Other process flows are possible.

FIG. 3 illustrates a process 300 executed by a network node operating as a timekeeper node and a process 350 executed by another network node operating as an scanner node. The process 300 includes an operation for the timekeeper node to receive an advertising message from an advertising node via an advertising channel (shown as block 302). The message includes a message identifier (ID) specific to the advertising message. The advertising node can be configured to broadcast advertising messages periodically via one or more advertising channels. The advertising node can be configured to advertise service and/or availability for a link layer connection. The advertising node can subsequently function as a slave node once a link layer connection has been set up with a peer network node.

The process 350 similarly includes an operation for the scanner node to receive the advertising message from the advertising node, the message including the same message ID (shown as block 352).

The process 300 includes an operation for the timekeeper node to generate another message having the same message ID and timestamp information identifying a time the message from the advertising node was received at the timekeeper node (shown as block 304). This message is subsequently transmitted to the scanner node (shown as block 306). This message can be transmitted either as an advertising message via an advertising channel, or as a direct message to the scanner node via a channel allocated for point-to-point communications.

The process 350 includes executing an operation for the scanner node to receive the message from the timekeeper node (shown as block 354). As discussed above, the message can be received via an advertising channel or via a channel allocated for point-to-point communications. This message includes timestamp information identifying a time the message from the advertising node was received at the timekeeper node. Thus, the scanner nodes receives two messages with the same message ID—i.e., a message from the advertising node and a message from the timekeeper node. The process 350 further includes executing an operation for the scanner node to calculate a clock adjustment value for an internal clock of the scanner node with respect to the advertising node (shown as block 356). This clock adjustment value is based, at least in part, on a difference (i.e., variation) between the time the message from the advertising node was received by the scanner node (i.e., the message received at block 352) and the timestamp information of the message received by the timekeeper node (i.e., the timestamp information of the message received at block 354).

The process 350 further includes executing an operation to transition an operational mode from a scanner operational mode to an advertising operational mode (shown as block 358). In some examples, a master node of the WPAN can invoke a node role rotation or switching process to change the operational modes of the nodes of the WPAN.

Figure 4:
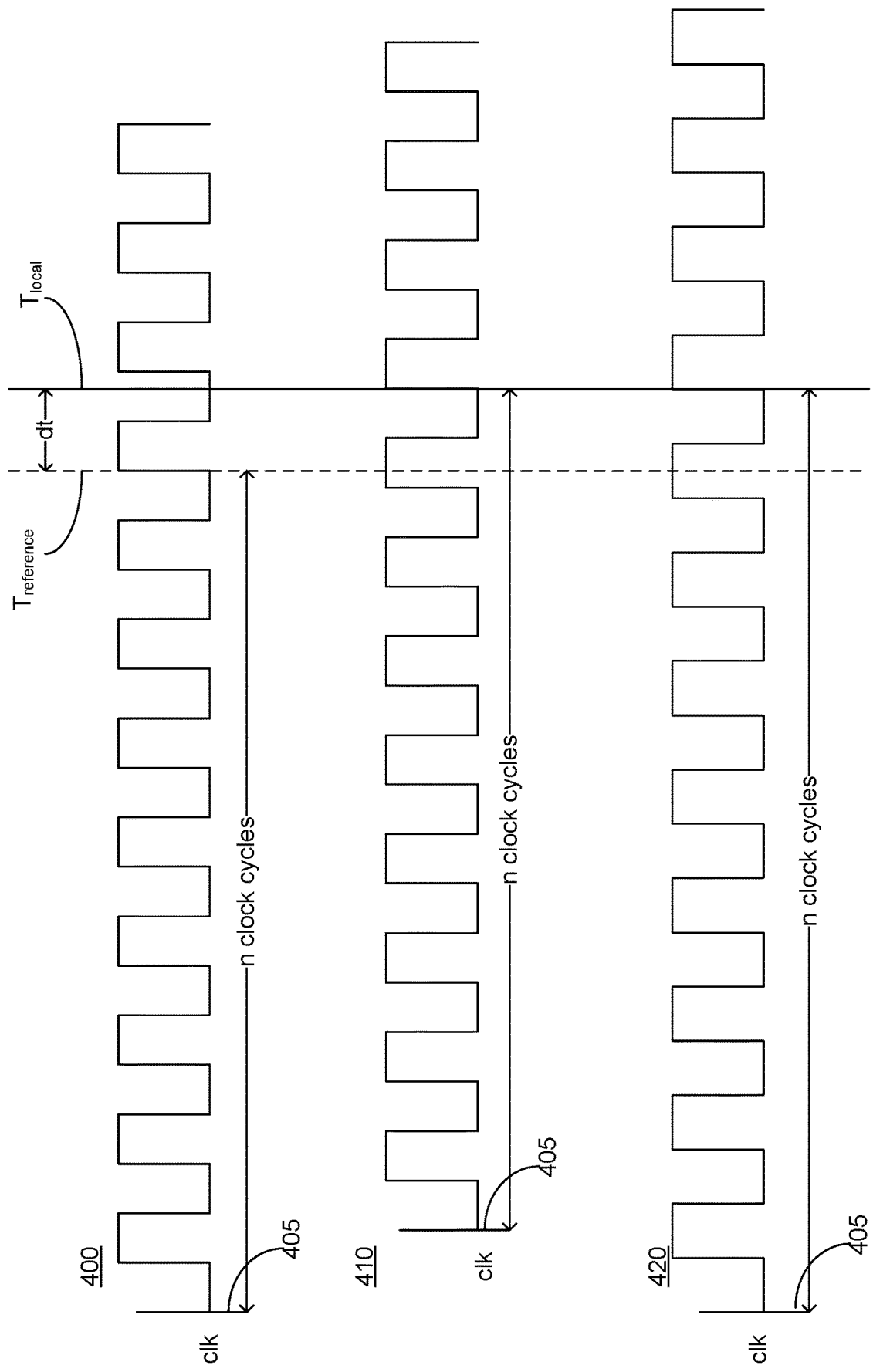
FIG. 4 is an illustration of clock synchronization operations in accordance with some examples of the disclosure.

FIG. 4 is an illustration of clock synchronization operations in accordance with some examples of the disclosure. A line graph 400 illustrates a clock signal graph for a scanner node of a network. An advertising message, including a message ID, is received from an advertising node at the scanner node at time $T_{local}$. A timekeeper message from a timekeeper node is subsequently received, which includes a timestamp $T_{reference}$ comprising a time an advertising message with the same message ID was received by the timekeeper node. In the line graph 400, the times $T_{local}$ and $T_{reference}$ are shown in relation to a clock signal of the system clock of the scanner node. The difference between $T_{local}$ and $T_{reference}$ is shown as the value dt.

The internal clock (e.g., clock circuitry) of a scanner node can be synchronized multiple times to an advertising node. In this example, n clock cycles have occurred between the time of the last synchronization event 405 and the timestamp $T_{reference}$. In some examples, synchronization events can comprise receiving both a message from an advertising node and a corresponding message from a timekeeper node having the same message ID, as described above. In other examples, synchronization events can comprise data received from a network node (e.g., an advertising node, a master node) for the scanner node to initiate a synchronization process.

In some examples, synchronization intervals can be determined as follows. For the equations discussed below, T is a time interval for the internal clock of the scanner node to provide a clock signal within an accuracy target. After this time interval has elapsed from the most recent synchronization event, the system clock may deviate more than the accuracy target. In some example implementations, such as BLE implementations, adverting message reception is probabilistic; for the equations discussed below, $P_{syncT}$ is the probability of the scanner node to synchronize its internal clock within time T, and $P_{rec}$ is a probability the scanner node is to receive at least one advertising message (e.g., in some examples, an advertising message can be broadcast on multiple channels). For an advertising channel in some example implementations, $P_{rec}=\frac{1}{3}$ (when the advertising messages is broadcast on three channels) and $PsyncT=(P_{rec})^2$. Thus, $P_{syncn}=1-(1-(P_{rec})^2)^n$, $n=T_{adv}$ where $P_{syncn}$ is a probability of at least one of n events is to be received by two nodes (e.g., the scanner node and the timekeeper node of the network) and thus become a synchronization event within time T, assuming $T_{adv}$ is an interval between advertising messages.

With regard to the advertising node, advertising messages can be sent every $T_{adv}$ and message IDs can be incremented after each message. If node role rotation or switching is used, scanner nodes can rotate or switch from a scanner role to a timekeeper role after $T_{role}$, where $T_{role}$ is less than T so that the node is kept in sync.

With regard to the timekeeper node, upon receipt of the adverting message, the reception time $T_{rec}$ is recorded, and a correction/synchronization message is sent with $T_{rec}$ and the message ID of the advertising message to one or more scanner nodes via advertising channels or direct channels (to guarantee delivery). Time to deliver the correction/synchronization message does not affect synchronization accuracy.

The line graphs 410 and 420 illustrate example internal clock adjustments that can be used by a scanner node according to calculated difference dt. In the line graph 410, the system clock is shown to be phase adjusted by dt such that the advertising message from the advertising node would have been received n clock cycles from the last synchronization event 405. In the line graph 420, the clock rate (i.e., pace) of the system clock is adjusted such that n clock cycles would have occurred between the time of the last synchronization event 405 and $T_{local}$.

Figure 5:
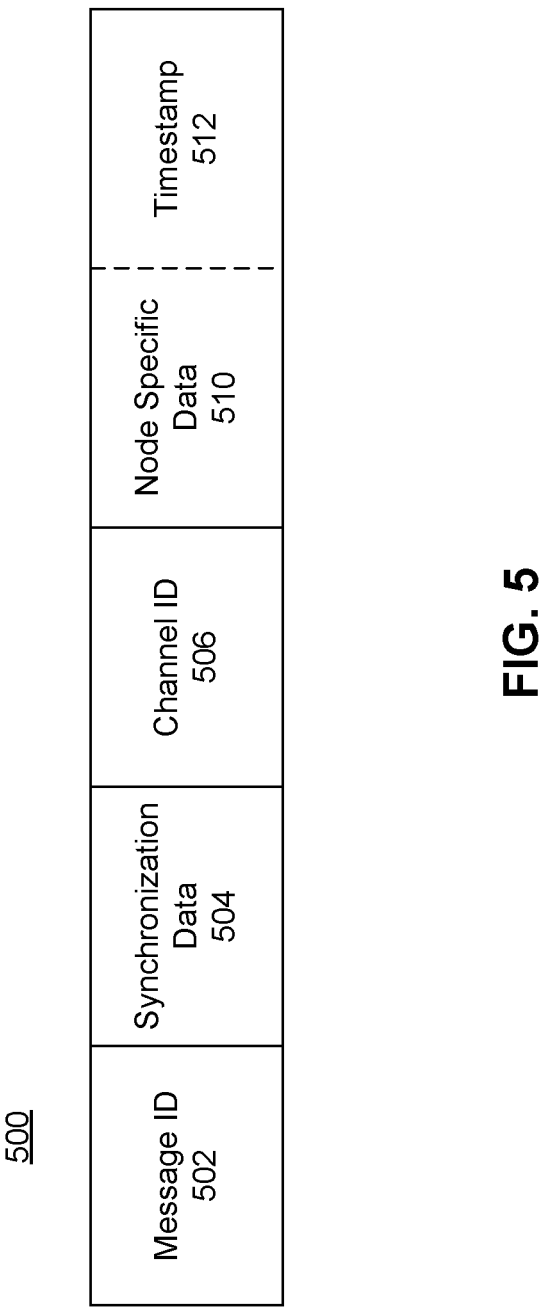
FIG. 5 is an illustration of an advertising transmission packet payload in accordance with some examples of the disclosure.

FIG. 5 is an illustration of an advertising transmission packet payload in accordance with some examples of the disclosure. An advertising message payload 500 is shown to comprise a plurality of data fields. The illustrated position of the data fields of the advertising message payload 500 corresponds to the order in which the fields are described below; other example payloads can include the data fields described below in different orders, as well as include additional data fields not described below.

A message identifier (ID) field 502 is an ID unique to the advertising packet transmission. An advertising node can, for example, increment or decrement ID values for each transmitted advertising packet. In some examples, a master node of the network allocates ID ranges for each of the advertising nodes of the network such that there is no duplicate ID used for adverting messages within the network.

A synchronization data field 504 identifies data used for synchronization between an advertising node and a scanner node. For example, the synchronization data field 504 can comprise a quantity of clock cycles since the most recent synchronization event between the advertising node and the scanner node (presuming both devices are clocked at the same frequency). The channel ID data field 506 can identify which channel the advertising message payload 500 was transmitted on. As discussed above, in some example implementations such as implementations utilizing a BLE protocol, advertising packets can be broadcast using a plurality of sequential transmissions of the same advertising packet on different frequency channels; this redundant transmission scheme can mitigate potential interference issues which can cause packet transmissions on some frequency channels to not be received by the scanner node.

Node specific data 510 can comprise any data specific to the node transmitting the advertising message. In some examples, timekeeper nodes can include timestamp information 512 identifying a time an advertising message was received by the timekeeper node, as discussed above. Further, in some examples, the node-specific data 510 can be used when the timekeeper node transmits an advertising message directed to a scanner node using a point-to-point transmission channel (e.g., data for specifying the node to receive the message, data identifying a direct node communication channel, message delivery data, etc.).

Figure 6:
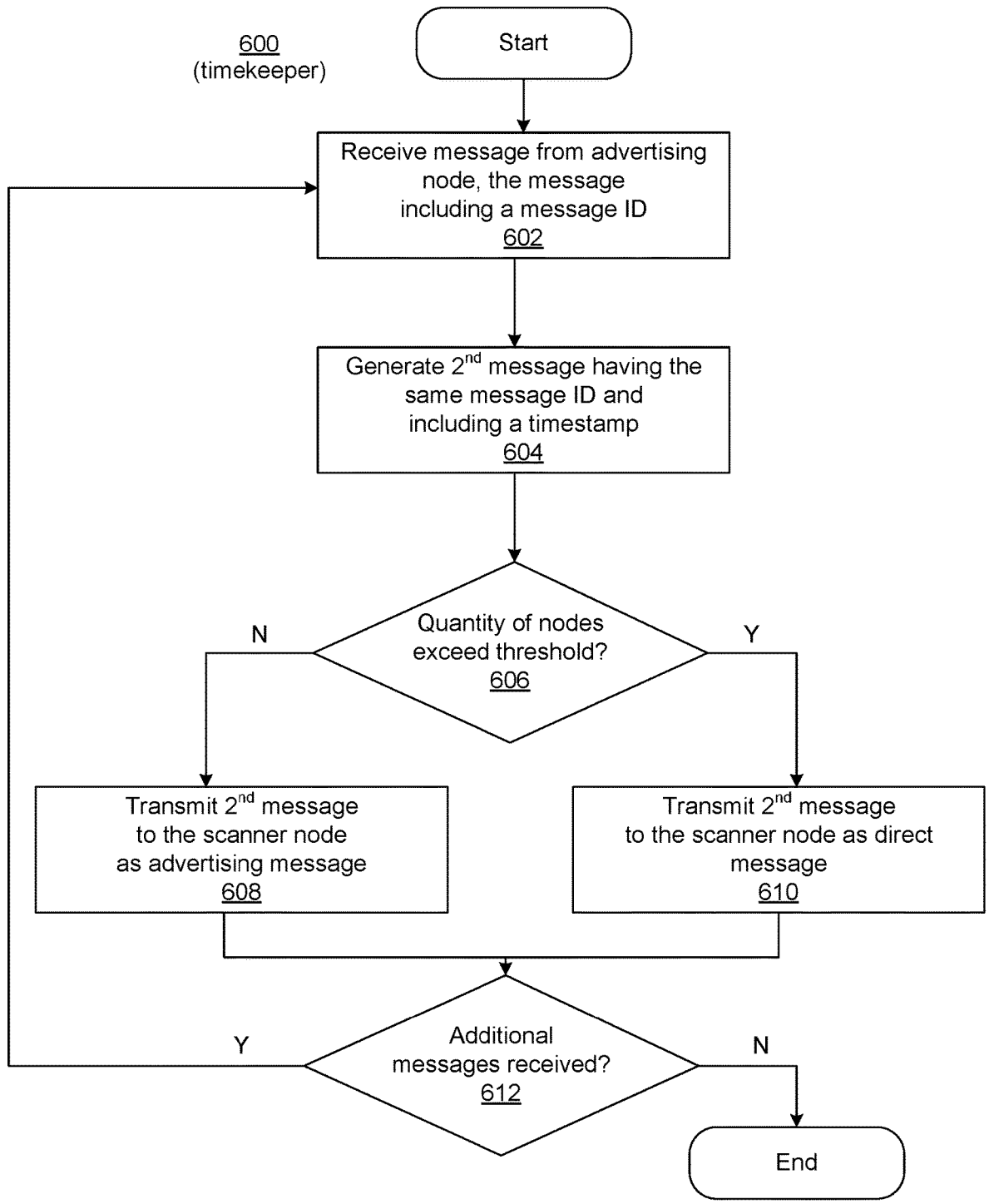
FIG. 6 is a flow diagram of a WPAN node executing timekeeper operations in accordance with some examples of the disclosure.

FIG. 6 is a flow diagram of a network node executing timekeeper operations in accordance with some examples of the disclosure. The process 600 includes an operation for a WPAN node operating as a timekeeper to receive an advertising message from an advertising node via an advertising channel (shown as block 602). The message includes a message ID specific to the advertising message. The process 600 includes an operation for the node operating as a timekeeper to generate another message having the same message ID and timestamp information identifying a time the message from the advertising node was received at the timekeeper node (shown as block 604).

A determination is made as to whether a quantity of nodes in the network exceeds a threshold value (shown as block 606). If the quantity of nodes in the network is less than a threshold value, the generated message is broadcast as an advertising message (i.e., transmitted via an advertising channel) (shown as block 608). If the quantity of nodes in the network is greater than a threshold value, potential concurrent data traffic can affect the probability that the target node receives the message generated by the timekeeper; thus, in this example, the generated message is transmitted directly to the target node via a point-to-point transmission channel (shown as block 610).

A determination is made as to whether additional advertising messages have been received and whether additional timestamp messages are to be subsequently generated and transmitted (shown as block 612). If additional advertising messages have been received, then operations to subsequently generate and transmit the corresponding timestamp messages are executed. In some examples, an operational mode of the node is transitioned from a timekeeper operational mode to a scanner operational mode. This transition can be in response to transmitting the generated message, in response to a time value elapsing, in response to a request issued from a master node of the WPAN, etc.

Figure 7:
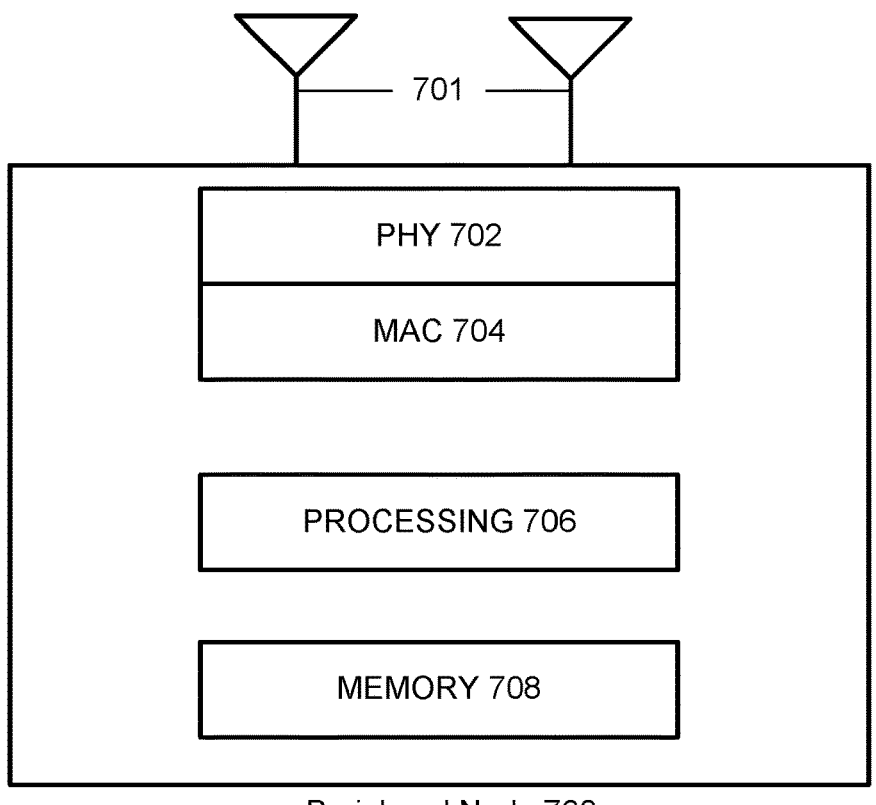
FIG. 7 shows a block diagram of a peripheral node and a central node of a WPAN in accordance with some examples of the disclosure.
Figure 7:
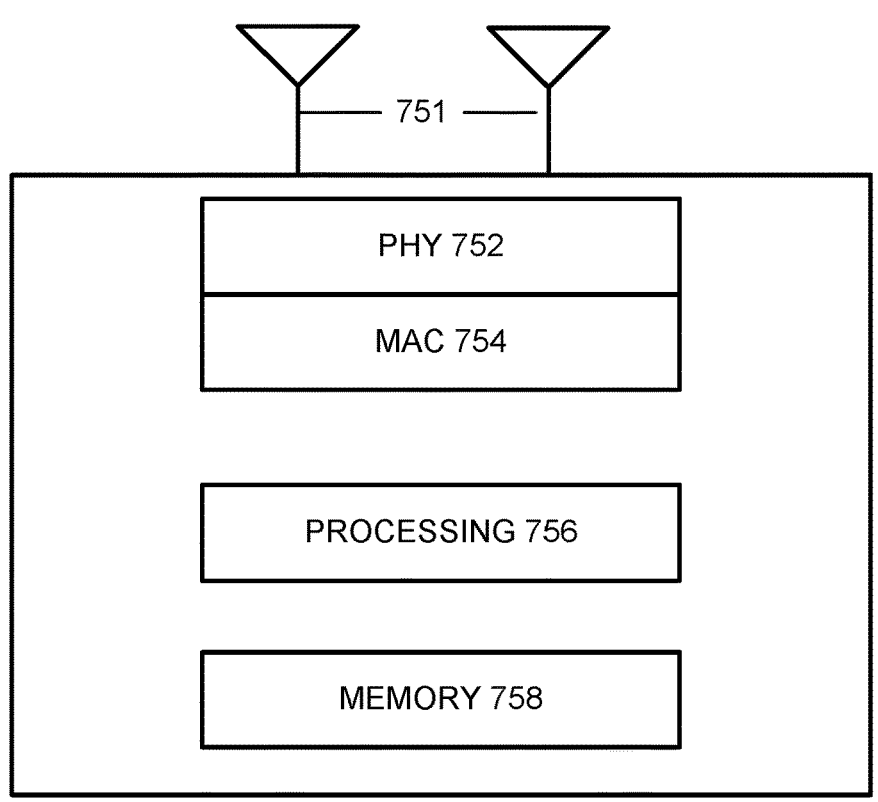

FIG. 7 shows a block diagram of a peripheral node and a central node of a WPAN in accordance with some examples of the disclosure. The peripheral node (i.e., slave node) 700 can be a mobile computing device, and the central node (i.e., master node) 750 can be a mobile computing device or a stationary (non-mobile) computing device. The peripheral node 700 can include physical layer circuitry (PHY) 702 for transmitting and receiving signals to and from the central node 750, other central nodes, other peripheral nodes, or other devices using one or more antennas 701, while the central node 750 can include physical layer circuitry (PHY)

752 for transmitting and receiving signals to and from the peripheral node 700, other central nodes, other peripheral nodes, or other devices using one or more antennas 751. The peripheral node 700 can also include medium access control layer (MAC) circuitry 704 for controlling access to the wireless medium, while the central node 750 can also include MAC circuitry 754 for controlling access to the wireless medium. The peripheral node 700 can also include processing circuitry 706 and memory 708 arranged to perform the operations described herein, and the central node 750 can also include processing circuitry 756 and memory 758 arranged to perform the operations described herein.

The antennas 701, 751 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) examples, the antennas 701, 751 can be effectively separated to benefit from spatial diversity and the different channel characteristics that can result.

Although the peripheral node 700 and central node 750 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry for performing at least the functions described herein. In some examples, the functional elements can refer to one or more processes operating on one or more processing elements.

Examples of the disclosure can be implemented in one or a combination of hardware, firmware, and software. Examples can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some examples can include one or more processors and can be configured with instructions stored on a computer-readable storage device.

In accordance with examples, the peripheral node 700 can operate in accordance with a D2D communication mode. The peripheral node 700 can include hardware processing circuitry 706 configured to determine a synchronization reference time based on reception of one or more signals from the central node 750. The hardware processing circuitry 706 can be further configured to, during a D2D communication session, transmit Multi-Time Transmission Interval Bundle Groups (MTBG) of data symbols during a first group of data transmission intervals (DTI) and refrain from transmission of data symbols during a second group of DTIs that is exclusive to the first group of DTIs. Starting times of the DTIs can be based at least partly on the synchronization reference time. The hardware processing circuitry 706 can be further configured to transmit, during an in-network communication session exclusive to the D2D communication session, data symbols according to a time transmission interval (TTI) reference time that is synchronized to the synchronization reference time. These examples are described in more detail below.

Figure 8:
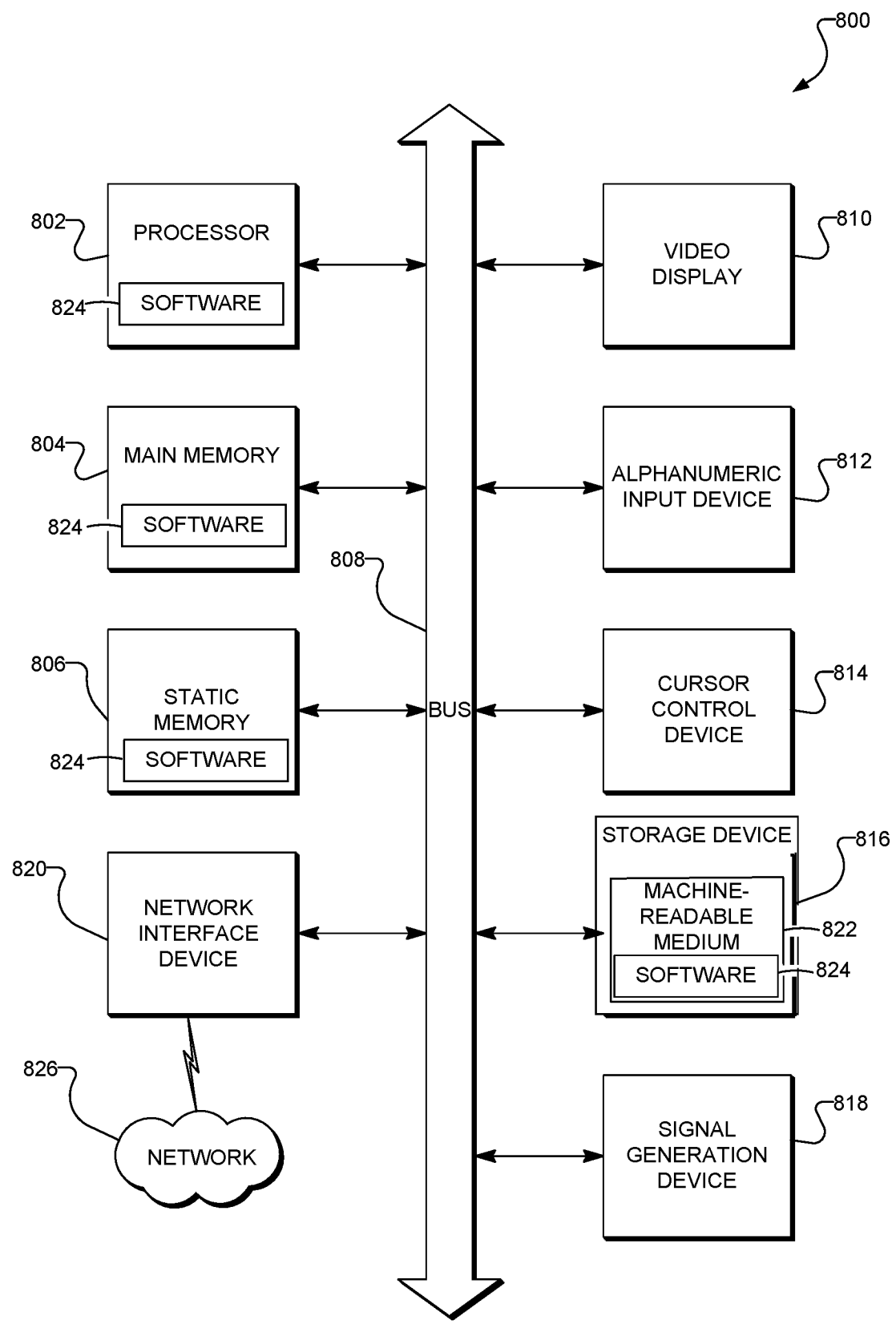
FIG. 8 is a block diagram illustrating components of a machine, according to some example examples, able to read instructions from a machine-readable medium and perform any one or more of the methodologies discussed herein, according to aspects of the disclosure.

FIG. 8 is a block diagram illustrating components of a machine, according to some example examples, able to read instructions from a machine-readable medium and perform any one or more of the methodologies discussed herein, according to aspects of the disclosure. In particular, FIG. 8 illustrates an exemplary computer system 800 (which can comprise any of the network elements discussed above) within which software 824 for causing the machine to perform any one or more of the methodologies discussed herein can be executed. In alternative examples, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 800 can function as any of the above described WPAN nodes, and can be a personal computer (PC), a wearable mobile computing device, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 can further include a video display unit 810 (e.g., a LCD or a cathode ray tube (CRT)). The computer system 800 also includes an alpha-numeric input device 812 (e.g., a keyboard), a user interface navigation (or cursor control) device 814 (e.g., a mouse), a storage device 816, a signal generation device 818 (e.g., a speaker), and a network interface device 820.

The storage device 816 includes a non-transitory machine-readable medium 822 on which is stored one or more sets of data structures and software 824 embodying or utilized by any one or more of the methodologies or functions described herein. The software 824 can also reside, completely or at least partially, within the main memory 804 and/or within the processor 802 during execution thereof by the computer system 800, with the main memory 804 and the processor 802 also constituting non-transitory, machine-readable media 822. The software 824 can also reside, completely or at least partially, within the static memory 806.

While the non-transitory machine-readable medium 822 is shown in an example implementation to be a single medium, the term "machine-readable medium" can include a single medium or multiple media (e.g., a centralized or distributed database, and/or associated caches and servers) that store the one or more software 824 or data structures. The term "machine-readable medium" can also be taken to include any tangible medium that is capable of storing, encoding, or carrying instructions for execution by the machine and that cause the machine to perform any one or more of the methodologies of the present examples, or that is capable of storing, encoding or carrying data structures utilized by or associated with such instructions. The term "machine-readable medium" can accordingly be taken to include, but not be limited to, solid-state memories, and optical and magnetic media. Specific examples of machine-readable media 822 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 824 can further be transmitted or received over a communications network 826 using a transmission medium. The software 824 can be transmitted using the network interface device 820 and any one of a number of well-known transfer protocols (e.g., HyperText Transfer Protocol (HTTP)). Examples of communication networks include a local area network (LAN), a wide area network (WAN), the internet, mobile telephone networks, plain old telephone service (POTS) networks, and wireless data networks (e.g., WiFi and WiMax networks). The term "transmission medium" can be taken to include any intangible medium capable of storing, encoding, or carrying instructions for execution by the machine, and includes digital or analog communications signals or other intangible media to facilitate communication of such software 824.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one example can be added to another example. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate example.

Some examples of the disclosure describe an apparatus of a wireless device, the apparatus comprising receiver circuitry configured to receive a first message, via an advertising channel, from an advertising node of a wireless personal area network (WPAN), the first message comprising an advertising message and a message identifier, and receive a second message from a timekeeper node of the WPAN, the second message comprising the message identifier of the first message and timestamp information identifying a time the second message was received by the timekeeper node. The apparatus also includes synchronization circuitry configured to calculate a time offset value for a clock circuitry with respect to the advertising node, the time offset value comprising a difference between a time the first message was received by the receiver circuitry and the timestamp information of the second message, and adjust the clock circuitry based, at least in part, on the time offset value.

In some examples, the synchronization circuitry is further configured to adjust a phase of the clock circuitry by the determined time offset value. In some examples, the synchronization circuitry is further configured to calculate a clock cycle count of the clock circuitry for a first clock signal interval, the first clock signal interval comprising an interval from a previous adjustment of the clock circuitry to the time the first message was received by the receiver circuitry, and adjust a clock rate of the clock circuitry wherein the clock cycle count comprises a second clock signal interval, the second clock signal interval comprising a time period from the previous adjustment of the clock circuitry to the timestamp information of the second message.

In some examples, the second message comprises an advertising message, and the receiver circuitry is further configured to receive the second message via an advertising channel. In some examples, the receiver circuitry is further configured to receive the second message via a channel allocated for direct node-to-node communications. In some examples, the receiver circuitry is further configured to receive the first message during an advertising channel reception interval and to receive the second message outside the advertising channel reception interval.

In some examples, the WPAN comprises at least one of a Bluetooth low energy (BLE) network, a Zigbee network, near field communication (NFC) network, or an radio frequency identification (RFID) network. In some examples, the receiver circuitry is to further receive a request from a master node of the WPAN to transition an operational mode from a scanner operational mode to an advertising operational mode, and the apparatus further comprises processing circuitry configured to transition the operational mode from the scanner operational mode to the advertising operational mode in response to receiving the request from the master node of the WPAN.

In some examples, the apparatus further comprises one or more antennas used by the receiver circuitry to receive the first message and the second message. In some examples, the apparatus further comprises transceiver circuitry to transmit and receive long range communication data via the one or more antennas for communication with a long range network comprising at least one of a wireless local area network (WLAN), a Long Term Evolution (LTE) network, or an LTE-Advanced (LTE-A) network.

Some examples of the disclosure describe a method comprising receiving a first message, via an advertising channel, from an advertising node of a wireless personal area network (WPAN), the first message comprising an advertising message and a message identifier, receiving a second message from a timekeeper node of the WPAN, the second message comprising the message identifier of the first message and timestamp information identifying a time the second message was received by the timekeeper node, calculating a time offset value for a clock circuitry with respect to the advertising node, the time offset value comprising a difference between a time the first message was received by the receiver circuitry and the timestamp information of the second message, and adjusting the clock circuitry based, at least in part, on the time offset value.

In some examples, the method further comprises adjusting a phase of the clock circuitry by the determined time offset value. In some examples, the method further comprises calculating a clock cycle count of the clock circuitry for a first clock signal interval, the first clock signal interval comprising an interval from a previous adjustment of the clock circuitry to the time the first message was received by the receiver circuitry, and adjusting a clock rate of the clock circuitry wherein the clock cycle count comprises a second clock signal interval, the second clock signal interval comprising a time period from the previous adjustment of the clock circuitry to the timestamp information of the second message.

In some examples, the second message comprises an advertising message, and the method further comprises receiving the second message via an advertising channel, or via a channel allocated for direct node-to-node communications. In some examples, the WPAN comprises at least one of a Bluetooth low energy (BLE) network, a Zigbee network, near field communication (NFC) network, or a radio frequency identification (RFID) network.

Some examples of the disclosure describe an apparatus of a wireless device, the apparatus comprising receiver circuitry configured to receive a first message, via an advertising channel, from an advertising node of a wireless personal area network (WPAN), the first message comprising an advertising message and comprising a message identifier, message generation circuitry configured to generate a second message comprising the message identifier of the first message and timestamp information identifying a time the first message was received, and transmission circuitry configured to transmit the second message to a scanner node of the WPAN.

In some examples, the second message comprises an advertising message and the transmission circuitry is further configured to transmit the second message via the advertising channel. In some examples, the transmission circuitry is further configured to transmit the second message via a channel allocated for direct node-to-node communications. In some examples, the receiver circuitry is further configured to receive the first message during an advertising channel transmission interval, and the transmission circuitry is further configured to transmit the second message outside the advertising channel transmission interval.

In some examples, the message generation circuitry is further configured to identify a quantity of network nodes of the WPAN, generate the second message as an advertising message for transmission via the advertising channel in response to determining the quantity of network nodes of the WPAN is less than a threshold value, and generate the second message as a direct message for transmission to the scanner node of the WPAN via a channel allocated for direct node-to-node communications in response to the quantity of network nodes of the WPAN exceeding the threshold value.

In some examples, the receiver circuitry is further configured to receive a third message from a second advertising node of the WPAN via the advertising channel, the third message comprising an advertising message and comprising a second message identifier, the message generation circuitry is further configured to generate a fourth message comprising the second message identifier of the third message and timestamp information identifying a time the third message was received, and the transmission circuitry is further configured to transmit the fourth message to the scanner node of the WPAN.

In some examples, the WPAN comprises at least one of a Bluetooth low energy (BLE) network, a Zigbee network, near field communication (NFC) network, or an radio frequency identification (RFID) network.

Some examples of the disclosure describe a non-transitory computer-readable storage medium that stores instructions for execution by one or more processors to perform operations to receive a first message, via an advertising channel, from an advertising node of a wireless personal area network (WPAN), the first message comprising an advertising message and comprising a message identifier, generate a second message comprising the message identifier of the first message and timestamp information identifying a time the first message was received, and transmit the second message to a scanner node of the WPAN.

In some examples, the operations further include operations to identify a quantity of network nodes of the WPAN, generate the second message as an advertising message for transmission via the advertising channel in response to the quantity of network nodes of the WPAN being less than a threshold value, and generate the second message as a direct message for transmission to the scanner node of the WPAN via a channel allocated for point-to-point communications in response to the quantity of network nodes of the WPAN exceeding the threshold value.

In some examples, the operations further comprise operations to transmit the second message to the scanner node via an advertising channel, or via a channel allocated for direct node-to-node communications.

The invention claimed is:

1. An apparatus of a wireless device, the apparatus comprising:
   receiver circuitry configured to:
      receive a first message, via an advertising channel, from an advertising node of a wireless personal area network (WPAN), the first message comprising an advertising message and a message identifier; and
      receive a second message from a timekeeper node of the WPAN, the second message comprising the message identifier of the first message and timestamp information identifying a time the first message was received by the timekeeper node; and
   synchronization circuitry configured to:
      calculate a time offset value for a clock circuitry with respect to the advertising node, the time offset value comprising a difference between a time the first message was received by the receiver circuitry and the timestamp information of the second message; and
      adjust the clock circuitry based, at least in part, on the time offset value.

2. The apparatus of claim 1, wherein the synchronization circuitry is further configured to adjust a phase of the clock circuitry by the time offset value.

3. The apparatus of claim 1, wherein the synchronization circuitry is further configured to:
   calculate a clock cycle count of the clock circuitry for a first clock signal interval; the first clock signal interval comprising an interval from a previous adjustment of the clock circuitry to the time the first message was received by the receiver circuitry; and
   adjust a clock rate of the clock circuitry wherein the clock cycle count comprises a second clock signal interval, the second clock signal interval comprising a time period from the previous adjustment of the clock circuitry to the timestamp information of the second message.

4. The apparatus of claim 1, wherein the second message comprises an advertising message, and the receiver circuitry is further configured to receive the second message via an advertising channel.

5. The apparatus of claim 1, wherein the receiver circuitry is further configured to receive the second message via a channel allocated for direct node-to-node communications.

6. The apparatus of claim 5, wherein the receiver circuitry is further configured to receive the first message during an advertising channel reception interval and to receive the second message outside the advertising channel reception interval.

7. The apparatus of claim 1, wherein the WPAN comprises at least one of a Bluetooth low energy (BLE) network, a Zigbee network, near field communication (NFC) network, or a radio frequency identification (RFID) network.

8. The apparatus of claim 1, wherein the receiver circuitry is to further receive a request from a master node of the WPAN to transition an operational mode from a scanner operational mode to an advertising operational mode, and the apparatus further comprises:
processing circuitry configured to transition the operational mode from the scanner operational mode to the advertising operational mode in response to receiving the request from the master node of the WPAN.

9. The apparatus of claim 1, further comprising:
one or more antennas used by the receiver circuitry to receive the first message and the second message.

10. The apparatus of claim 9, further comprising:
transceiver circuitry to transmit and receive long range communication data via the one or more antennas for communication with a long range network comprising at least one of a wireless local area network (WLAN), a Long Term Evolution (LTE) network, or an LTE-Advanced (LTE-A) network.

11. A method comprising:
receiving a first message, via an advertising channel, from an advertising node of a wireless personal area network (WPAN), the first message comprising an advertising message and a message identifier;
receiving a second message from a timekeeper node of the WPAN, the second message comprising the message identifier of the first message and timestamp information identifying a time the first message was received by the timekeeper node;
calculating a time offset value for a clock circuitry with respect to the advertising node, the time offset value comprising a difference between a time the first message was received by the receiver circuitry and the timestamp information of the second message; and
adjusting the clock circuitry based, at least in part, on the time offset value.

12. The method of claim 11, further comprising:
adjusting a phase of the clock circuitry by the time offset value.

13. The method of claim 11, further comprising:
calculating a clock cycle count of the clock circuitry for a first clock signal interval, the first clock signal interval comprising an interval from a previous adjustment of the clock circuitry to the time the first message was received by the receiver circuitry; and
adjusting a clock rate of the clock circuitry wherein the clock cycle count comprises a second clock signal interval, the second clock signal interval comprising a time period from the previous adjustment of the clock circuitry to the timestamp information of the second message.

14. The method of claim 11, wherein the second message comprises an advertising message, and the method further comprises:
receiving the second message via an advertising channel, or via a channel allocated for direct node-to-node communications.

15. The method of claim 11, wherein the WPAN comprises at least one of a Bluetooth low energy (BLE) network, a Zigbee network, near field communication (NFC) network, or a radio frequency identification (RFID) network.

16. A non-transitory computer-readable storage medium that stores instructions executable by one or more processors to:
receive a first message, via an advertising channel, from an advertising node of a wireless personal area network (WPAN), the first message comprising an advertising message and a message identifier; and
receive a second message from a timekeeper node of the WPAN, the second message comprising the message identifier of the first message and timestamp information identifying a time the first message was received by the timekeeper node;
calculate a time offset value for a clock circuitry with respect to the advertising node, the time offset value comprising a difference between a time the first message was received by the receiver circuitry and the timestamp information of the second message; and
adjust the clock circuitry based, at least in part, on the time offset value.

17. The non-transitory computer-readable storage medium of claim 16, wherein the program instructions are further executable to adjust a phase of the clock circuitry by the time offset value.

18. The non-transitory computer-readable storage medium of claim 16, wherein the program instructions are further executable to:
calculate a clock cycle count of the clock circuitry for a first clock signal interval, the first clock signal interval comprising an interval from a previous adjustment of the clock circuitry to the time the first message was received by the receiver circuitry; and
adjust a clock rate of the clock circuitry wherein the clock cycle count comprises a second clock signal interval, the second clock signal interval comprising a time period from the previous adjustment of the clock circuitry to the timestamp information of the second message.

19. The non-transitory computer-readable storage medium of claim 16, wherein the second message comprises an advertising message, and the receiver circuitry is further configured to receive the second message via an advertising channel.

20. The non-transitory computer-readable storage medium of claim 16, wherein the program instructions are further executable to receive the second message via a channel allocated for direct node-to-node communications.

21. The non-transitory computer-readable storage medium of claim 20, wherein the program instructions are further executable to receive the first message during an advertising channel reception interval and to receive the second message outside the advertising channel reception interval.

22. The non-transitory computer-readable storage medium of claim 16, wherein the WPAN comprises at least one of a Bluetooth low energy (BLE) network, a Zigbee network, near field communication (NFC) network, or a radio frequency, identification (RFID) network.

23. The non-transitory computer-readable storage medium of claim 16, wherein the program instructions are further executable to:

receive a request from a master node of the WPAN to transition an operational mode from a scanner operational mode to an advertising operational mode;

transition the operational mode from the scanner operational mode to the advertising operational mode in response to receiving the request from the master node of the WPAN.

\* \* \* \* \*